US008876210B2

(12) United States Patent
Magstadt

(10) Patent No.: US 8,876,210 B2
(45) Date of Patent: Nov. 4, 2014

(54) DOUBLE ARTICULATING DENTAL CHAIR HEADREST APPARATUS

(71) Applicant: Jason Magstadt, Newberg, OR (US)

(72) Inventor: Jason Magstadt, Newberg, OR (US)

(73) Assignee: Beaver State Dental, Inc., Newberg, OR (US)

( * ) Notice: Subject to any disclaimer, the term of this patent is extended or adjusted under 35 U.S.C. 154(b) by 107 days.

(21) Appl. No.: 13/711,838

(22) Filed: Dec. 12, 2012

(65) Prior Publication Data

US 2014/0145488 A1 May 29, 2014

Related U.S. Application Data

(60) Provisional application No. 61/730,276, filed on Nov. 27, 2012.

(51) Int. Cl.
*B60R 22/28* (2006.01)
*A61G 15/12* (2006.01)

(52) U.S. Cl.
CPC .................................... *A61G 15/125* (2013.01)
USPC ........................................... 297/408; 297/409

(58) Field of Classification Search
CPC ...... A47C 7/38; A61G 15/125; B60N 2/4805; B60N 2/4844; B60N 2/4847; B60N 2/4864
USPC ............. 297/391, 403, 408; 403/359.1–359.6
See application file for complete search history.

(56) References Cited

U.S. PATENT DOCUMENTS 1,728,025 A 9/1929 Weber
2,463,410 A 3/1949 Morris
2,652,101 A 9/1953 Samsky et al.
3,071,412 A 1/1963 Meade
3,477,761 A 11/1969 Krantz
3,586,374 A 6/1971 Laessker
RE29,811 E 10/1978 Norris
5,177,823 A * 1/1993 Riach ................................ 5/636
5,590,933 A 1/1997 Andersson
5,971,485 A * 10/1999 Clark ....................... 297/423.12
6,718,582 B1 4/2004 Tinsley
6,857,704 B2 * 2/2005 Stenzel et al. ................ 297/408
6,962,392 B2 11/2005 O'Connor
7,093,313 B2 8/2006 DeBraal et al.
7,240,966 B2 7/2007 Stone et al.
7,610,639 B2 11/2009 Roleder et al.
7,770,977 B2 8/2010 Diller
7,832,803 B2 11/2010 Cassaday
7,871,130 B2 * 1/2011 da Silva Netto et al. ..... 297/408
7,914,079 B2 3/2011 Link
2008/0191536 A1 * 8/2008 Hyvarinen .................... 297/408
2009/0001799 A1 * 1/2009 Diller ............................ 297/400

* cited by examiner

*Primary Examiner* — David R Dunn
*Assistant Examiner* — Jody Giacoman
(74) *Attorney, Agent, or Firm* — Miller Nash LLP; Chandra E. Eidt

(57) ABSTRACT

The present invention provides an improved adjustable chair headrest. Specifically, the present invention comprises a double articulating dental chair headrest apparatus which has a one-handed side pushbutton release and locking mechanism. When pressed, the pushbutton temporarily disengages a movable mating plate having splined perforations away from each of two corresponding rotatable splined pin assemblies to unlock each splined pin assembly. The unlocked splined pin assemblies each rotate independently. Each splined pin assembly is also fixedly attached to one of a headrest and a backrest via an attachment plate. The two splined pin assemblies are held in relation to each other, the movable mating plate having splined perforations, and the side pushbutton release and locking mechanism, by a housing component.

20 Claims, 10 Drawing Sheets

DOUBLE ARTICULATING DENTAL CHAIR HEADREST APPARATUS

CROSS-REFERENCE TO RELATED APPLICATION

This application claims the benefit of U.S. Provisional Application No. 61/730,276, filed Nov. 27, 2012.

BACKGROUND OF THE INVENTION

1. Field of the Invention

The present invention relates to the field of adjustable headrests for chairs. Specifically, the present invention comprises a double articulating dental chair headrest apparatus which has a one-handed side pushbutton release and locking mechanism. When pressed, the pushbutton disengages a movable mating plate having splined perforations away from each of two corresponding rotatable splined pin assemblies to unlock each splined pin assembly. The unlocked splined pin assemblies each rotate independently. Each splined pin assembly is also fixedly attached to one of a headrest and a backrest via an attachment plate. The two splined pin assemblies are held in relation to each other, the movable mating plate having splined perforations, and the side pushbutton release and locking mechanism, by a housing component.

2. Description of Related Art

Many attempts have been made to produce a streamlined, comfortable, and easily adjustable headrest for chairs comprising a headrest that is a separate component from a chair backrest, but such attempts have failed to provide the range of adjustability, purity of form and function, comfort, and ease of use that may be desired. Specifically, improved adjustable headrests specific to the dental and medical fields are needed to provide comfort to the patient while at the same time facilitating the examination and work performed by the medical professional.

Many conventional chair headrests are mounted on chair backrests by a mechanism that provides some degree of adjustability. However, conventional chair headrest adjustment often provides adjustment along only a singular axis, such as by using one hand to loosen and then re-tighten a screw-actuated mechanism while using the other hand to adjust the headrest and lock it into place.

A more desirable mechanism would allow headrest adjustment by actuation of a single-handed release and/or lock mechanism. Further, an adjustment mechanism that would allow headrest adjustment along multiple axes by actuation of a single-handed release and/or lock mechanism would provide significant advantages to its user and the patient relative to conventionally available headrest adjustment apparatuses.

BRIEF SUMMARY OF THE INVENTION

The present invention includes a double articulating dental chair headrest apparatus that overcomes disadvantages associated with prior adjustable headrests and imparts several new and distinct advantages.

The present invention provides, for the first time, a simple design for the one-handed release and locking of double articulating members to permit adjustment of the dental chair headrest relative to the dental chair backrest. The splined mating surfaces incorporated in the double articulating dental chair headrest apparatus of the present invention permit fast, easy, secure, and finely tuned adjustment of the dental chair headrest relative to the dental chair backrest for maximum comfort by the user, and ease of use by the dental professional. The streamlined design of the present invention also provides an aesthetically pleasing form and results in eased manufacturing and maintenance due to the low number of component parts. The streamlined design of the present invention also provides for a strong and durable double articulating dental chair headrest apparatus due to the use of few component parts made of high quality materials and arranged in a straight-forward and intelligent manner that limits the introduction of problems via user error. The user need only use one hand to depress the pushbutton release and locking mechanism to permit adjustment of the headrest relative to the backrest of the dental chair. The ability to use only one hand to accomplish the release and locking of the adjustment mechanism reduces the work required on the part of the user to accomplish chair adjustment, results in less distracting and less time-consuming chair adjustment for both the user and the patient, and, optionally, frees the user's other hand to perform other tasks.

Principle components of the present invention include two rotatable splined pin assemblies, a movable mating plate having splined perforations corresponding to each of the two rotatable splined pin assemblies, a pushbutton release and locking mechanism, and a housing component.

An exemplary preferred embodiment is described in detail below, but should not be construed as limiting on the present invention as generally disclosed by this application.

In a preferred embodiment, a spring mounted pushbutton release and locking mechanism is connected to a movable mating plate having two splined perforations that correspond to splined surfaces located on each of two rotatable splined pin assemblies. The release and locking action of the double articulating dental chair headrest apparatus is caused by a user's depression of the spring mounted pushbutton which modifies the contact between each of, the splined surfaces located on each of the two rotatable splined pin assemblies, and the movable mating plate having splined perforations. When the spring mounted pushbutton is not activated, i.e., not depressed, the movable mating plate having splined perforations that correspond to each of the two rotatable splined pin assemblies is locked in place by the interaction and contact between the splined surfaces located on each of the two rotatable splined pin assemblies and the corresponding splined perforations of the movable mating plate. Depression of the pushbutton pushes the movable mating plate away from and apart from each of the two rotatable splined pin assemblies, thus breaking the interaction and contact between the splined surfaces located on each of the two rotatable splined pin assemblies and the corresponding splined perforations of the movable mating plate and releasing each of the two rotatable splined pin assemblies to rotate about an axis. That is, once the mating plate is pushed away and apart from each of the rotatable splined pin assemblies, each of these assemblies is simultaneously released and permitted to rotate independently. Once adjustment of the headrest relative to the backrest of the dental chair is accomplished, the user discontinues application of pressure to the spring mounted pushbutton which, in turn, causes the movable mating plate to return to an apparatus locking position due to the contact and interaction between the two splined perforations on the movable mating plate and the splined surfaces located on each of the two rotatable splined pin assemblies. The density of the splined surfaces located on the movable mating plate and the rotatable splined pin assemblies permits fine-tuned dental chair adjustment. In a preferred embodiment, the splined surfaces located on each of the two rotatable splined pin assemblies are equipped with 48 teeth at a 0.721 inch diameter and have a class 7 fit.

The movable mating plate having splined perforations can be fixedly attached to a bottom surface of a generally T-shaped pushbutton, although the pushbutton can comprise a variety of shapes.

The two rotatable splined pin assemblies are held spaced apart and in relation to each other, the movable mating plate, and the pushbutton by a housing component. The housing component generally provides a protective shell for the movable mating plate having splined perforations and the corresponding splined mating parts of the two rotatable splined pin assemblies. As noted above, adjustment of the dental chair headrest is actuated by the application of pressure to a pushbutton release and locking mechanism.

In a preferred embodiment, the housing component holds the two rotatable splined pin assemblies in parallel orientation to each other. Each of the two rotatable splined pin assemblies is oriented in the same direction, having a first splined end with a toothed surface area that corresponds to the movable mating plate having splined perforations and a second attachment end extending through and outwardly from the housing component. The first splined end of each of the two rotatable splined pin assemblies is held in place by a snap ring. The second attachment ends of each of the two rotatable splined pin assemblies extends through and outwardly from the housing component, and are used to connect with one of a headrest attachment plate and a backrest attachment plate.

The housing component may comprise a variety of shapes. In a preferred embodiment, the housing component is generally oval-shaped. In a particularly preferred embodiment, the housing component also provides concave surfaces located generally in the middle of each of the two longest outermost surfaces without penetrations, thus, modifying the general oval-shape of the housing component to more of a dog bone-shape (for example, as generally depicted in FIG. 1). A first side surface of the housing component is substantially flat and has three openings corresponding to parts of each of the two rotatable splined pin assemblies and the pushbutton. A second side surface of the housing component, which is opposite to the first side surface, is also substantially flat as defined by the outer peripheral edges of the housing component which surround an internal open space. The remaining surfaces of the housing component present a substantially flat, continuous, and uninterrupted smooth oval-shaped or dog bone-shaped exterior.

It is an object of the invention to provide a housing component that permits the easy handling and adjustment of the headrest apparatus. Such handling and adjustment can be facilitated by providing a housing component that is easy to grip with one hand while optionally pressing, or otherwise activating, the pushbutton release and locking mechanism. Accordingly, the pushbutton and/or the housing component may be shaped to permit easy gripping, handling, and manipulation with one hand.

On the outside surface of the housing component, each of the two rotatable splined pin assemblies provides rotatable attachment via second attachment ends of each of the two rotatable splined pin assemblies which extend through and outwardly from the housing component to one of a headrest attachment plate and a backrest attachment plate. The range of rotation provided to the headrest attachment plate and the backrest attachment plate can be limited by the shape of the attachment plates, the housing component, and the external surface of the pushbutton. Each of the two rotatable splined pin assemblies can be locked at any of a variety of angles within a range of rotation about its fixed axis, limited only by the density of the splined teeth on each of the two rotatable splined pin assemblies and the two splined perforations on the movable mating plate, and the physical interruption of movement, if any, provided by one or more of the shape of the attachment plates, the housing component, and the external surface of the pushbutton. In a particularly preferred embodiment, the headrest attachment plate has a maximum of about 180 degrees of rotation relative to the housing component, and the backrest attachment plate has a maximum of about 270 degrees of rotation relative to the housing component.

In one embodiment, the housing component can provide a uniformly smooth outer surface. In another embodiment, the housing component can provide a surface that facilitates gripping the adjustment apparatus. Any grip surface provided on the housing component of the present invention may either be formed integrally as part of the housing component, or provided as a separate component. For example, a separate gripping surface may be additionally be adhered to the outside of the housing component and provided as part of the invention.

Various fastening means are also contemplated as part of the present invention. For example, screws or welding or other means can be used to fixedly attach any of the movable mating plate having splined perforations to a bottom surface of a pushbutton, the headrest attachment plate to a first rotatable splined pin assembly, the backrest attachment plate to a second rotatable splined pin assembly, and an optional cover plate to one of the movable mating plate having splined perforations or the outer peripheral edges of the external second side surface of the housing component.

The various components of the present invention may comprise different materials. For example, the housing component may be made of any grade of steel or aluminum. Either or both of two rotatable splined pin assemblies may be formed from any grade of steel or aluminum. The pushbutton may be made of any grade of steel, aluminum, or plastic. The movable mating plate may be made of any grade of steel or aluminum. The headrest attachment plate and the backrest attachment plate may be made of any grade of steel or aluminum. The splined surfaces may be treated with plating and grease. Washers included as part of the invention may be made of any grade of steel, aluminum, or plastic. Snap rings included as part of the invention may be made of any grade of steel.

In a particularly preferred embodiment, the housing component is aluminum, the rotatable splined pin assemblies are steel, the pushbutton is a hard plastic (preferably DELRIN®), the movable mating plate is steel, the headrest attachment plate and the backrest attachment plate are steel, the splined surfaces are treated with electroless nickel plating, the washers are plastic, and the snap rings are steel.

Various lubricants may be used as part of the present invention, including general purpose grease or lubricant. In a particularly preferred embodiment, the lubricant is lithium grease.

It is also contemplated that the present invention may include rotatable splined pin assemblies that are integrally formed with at least one of the headrest attachment plate and the backrest attachment plate.

Although this invention has been described with reference to dental chairs, it is also applicable to other chairs, for example, other patient and medical chairs and beds, massage chairs and beds, automobile seats, plane seats, train seats, lounge chairs, office and home furniture, and anywhere where the benefits of the present invention can be enjoyed.

While preferred embodiments have been shown and described, those skilled in the art will recognize that changes and modifications may be made to the foregoing examples without departing from the scope and spirit of the invention. In particular, it is noted that the external appearance of the present invention may vary considerably from the appearance of the specific embodiments disclosed herein without departing from the scope and spirit of the invention. It is thus intended to claim all such changes and modifications that fall within the scope and spirit of the invention.

BRIEF DESCRIPTION OF THE FIGURES

The accompanying Figures, which are incorporated in and constitute a part of this specification, illustrate various exemplary embodiments.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structures. Elements common between Figures may retain the same numerical designation.

Figure 1:
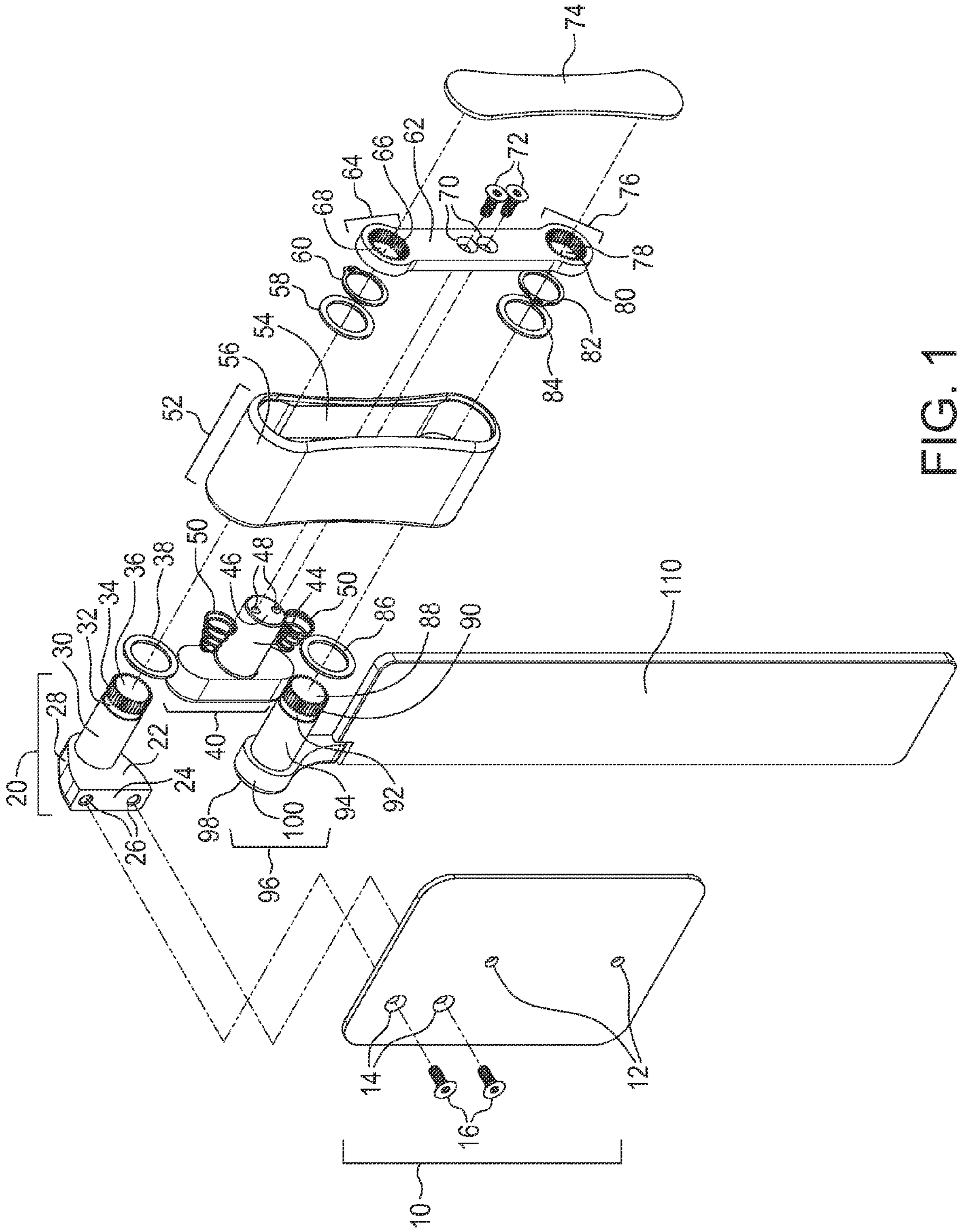
FIG. 1 provides an exploded perspective view of the component parts and assembly of a double articulating dental chair headrest apparatus.

FIG. 1 provides an exploded perspective view of the component parts and assembly of the double articulating dental chair headrest apparatus. As depicted, the primary components of the headrest include a first rotatable splined pin assembly 20, a second rotatable splined pin assembly 96, a housing component 52, a movable mating plate 62 having splined perforations 68 and 80, and a pushbutton assembly 40.

The headrest attachment plate 10 is generally rectangular in shape with rounded edges. The headrest attachment plate 10 has openings 12 to permit connection of the headrest attachment plate 10 to a headrest. The headrest attachment plate 10 has openings 14 to permit connection of the headrest attachment plate 10 to the first rotatable splined pin assembly 20, for example, by fastening means 16.

The first rotatable splined pin assembly 20 comprises an outer head portion 22, which has a generally triangular-shaped outer side surface 28, a flat plate attachment surface 24, and fastening openings 26 to permit connection of the headrest attachment plate 10. The first rotatable splined pin assembly 20 also comprises a first splined pin axle 30, which has a reduced circumference ring area 32 where the snap ring 60 attaches, a circumferentially toothed spline portion 34, and a flat circular end surface 36.

The pushbutton assembly 40 is generally T-shaped, with the outer pushbutton surface having a generally oval shape corresponding to the top of the T-shape. The pushbutton assembly 40 comprises an extended shaft 44 having fastening openings 48 in a flat surface 46, corresponding to the bottom of the T-shape, for connection to the movable mating plate 62 having splined perforations 68 and 80 via fastening openings 70 and fastening means 72. As assembled, two springs 50 are located on either side of the extended shaft 44 and between the bottom surface of the top of the T-shape of the pushbutton assembly 40 and the pushbutton surface 114 (not shown and not indicated) of a first outer surface 122 (not shown and not indicated) of housing component 52 and on either side of opening 118 (not shown and not indicated) located on the pushbutton surface 114 of a first outer surface 122 of housing component 52.

The second rotatable splined pin assembly 96 includes an outer head portion 98. The outer head portion 98 has a generally circular-shaped outer side surface 100, an (optional) attachment surface 102 (not shown and not indicated), and one or more optional fastening openings 104 (not shown and not indicated) to permit connection of the second rotatable splined pin assembly 96 to the backrest attachment plate 110. Alternatively, the second rotatable splined pin assembly 96 and the backrest attachment plate 110 may be integrally formed as one unit. The second rotatable splined pin assembly 96 also comprises a second splined pin axle 94, which has a reduced circumference ring area 92 where the snap ring 82 attaches, a circumferentially toothed splined portion 90, and a flat circular end surface 88.

The first rotatable splined pin assembly 20 and the second rotatable splined pin assembly 96 are inserted into circular-shaped splined pin assembly openings 112 (not shown and not indicated) on the first outer surface 122 (not shown and not indicated) of housing component 52, which, as shown here, is generally oval-shaped, and also provides concave surfaces located generally in the middle of each of the two longest outermost surfaces without penetrations, thus, modifying the general oval-shape of the housing component to more of a dog bone-shape. Mounted onto each of the first splined pin axle 30 and the second splined pin axle 94 are nylon washer 38 and nylon washer 86, respectively. As assembled, the nylon washer 38 is located between the first outer surface 122 (not shown and not indicated) of housing component 52 and the interior surface of the outer head portion 22 of the first rotatable splined pin assembly 20 and around the first splined pin axle 30. Also, as assembled, the nylon washer 86 is located between the first outer surface 122 (not shown and not indicated) of housing component 52 and the interior surface of the outer head portion 98 of the second rotatable splined pin assembly 96 and around the second splined pin axle 94.

The housing component 52 comprises a bottom internal surface 120 (not shown and not indicated) which is opposite to the substantially flat first outer surface 122 (not shown and not indicated) that has two similarly sized splined pin assembly openings 112 (not shown and not indicated) to accommodate, on one end, passage of the first splined pin axle 30 of the first rotatable splined pin assembly 20, and on another end, passage of the second splined pin axle 94 of the second rotatable splined pin assembly 96. The pushbutton surface 114 (not shown and not indicated) of a first outer surface 122 (not shown and not indicated) of housing component 52 also includes an opening 118 (not shown and not indicated) to accommodate passage of the extended shaft 44 of the T-shaped pushbutton assembly 40. The T-shaped pushbutton assembly 40 is located between the first rotatable splined pin assembly 20 and the second rotatable splined pin assembly 96. The housing component 52 has a uniformly smooth outer surface 56, and an interior cavity 54. The interior cavity 54 of the housing component 52 defines an internal open space that accommodates the extended shaft 44 of the pushbutton assembly 40, the first splined pin axle 30, the second splined pin axle 94, and the movable mating plate 62 having splined perforations 68 and 80. The plane occupied by the second side surface of the housing component 52, which is opposite to the first substantially flat outer surface 122 (not shown and not indicated), is also substantially flat as defined by the outer peripheral edges of the housing component 52 which surround interior cavity 54.

The movable mating plate 62 having splined perforations 68 and 80 includes, at a first end portion 64, a first splined perforation 68 with a splined surface 66 corresponding to the circumferentially toothed splined portion 34 of the first rotatable splined pin assembly 20. The movable mating plate 62 having splined perforations 68 and 80 further includes, at a second end portion 76, a second splined perforation 80 with a splined surface 78 corresponding to the circumferentially toothed splined portion 90 of the second rotatable splined pin assembly 96. Also included on the movable mating plate 62 having splined perforations 68 and 80 are fastening openings 70 to permit connection of the movable mating plate 62 to the pushbutton assembly 40 via fastening openings 48 in flat surface 46 on the bottom of the pushbutton assembly 40. Optionally, a cover plate 74 may be used to cover the outer surface area defined by the movable mating plate 62 having splined perforations 68 and 80 and the interior cavity 54 of the housing component 52.

As assembled, the nylon washer 58 and snap ring 60 are located between the bottom internal surface 120 (not shown and not indicated) opposite to the first outer surface 122 (not shown and not indicated) of the housing component 52 and the interior surface the first end portion 64 of the movable mating plate 62 having splined perforations 68 and 80 and around the first splined pin axle 30. Specifically, the snap ring 60 is located on reduced circumference ring area 32 of the first splined pin axle 30. Also, as assembled, the nylon washer 84 and snap ring 82 are located between the bottom internal surface 120 (not shown and not indicated) opposite to the first outer surface 122 (not shown and not indicated) of the housing component 52 and the interior surface the second end portion 76 of the movable mating plate 62 having splined perforations 68 and 80 and around the second splined pin axle 94. Specifically, the snap ring 82 is located on reduced circumference ring area 92 of the second splined pin axle 94.

Figure 2:
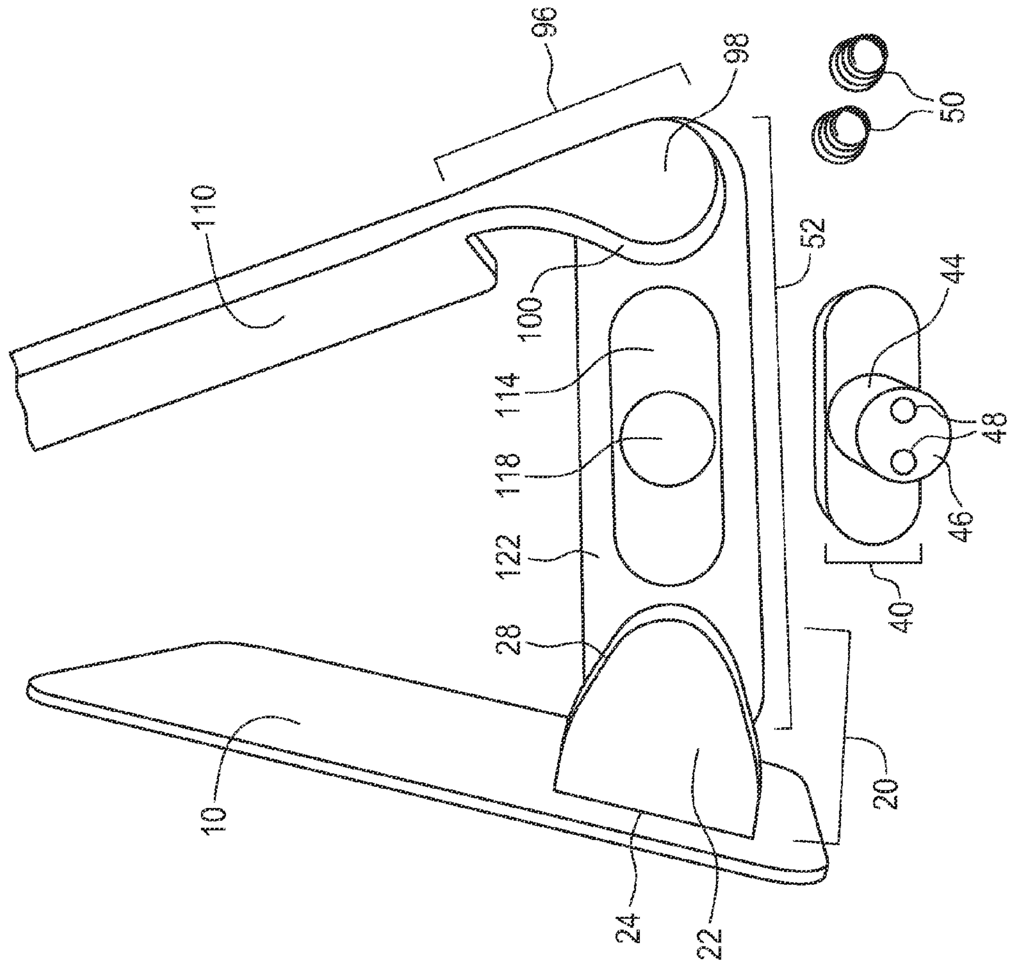
FIG. 2 provides a side view of a folded and partially dis-assembled double articulating dental chair headrest apparatus, with the pushbutton assembly and springs removed.

FIG. 2 provides a partial side view of a folded and partially dis-assembled double articulating dental chair headrest apparatus according to the present invention, with the pushbutton assembly 40 and springs 50 removed. As depicted, the housing component 52 is generally oval-shaped and comprises a pushbutton surface 114 that is generally oval in shape and includes an opening 118 to accommodate passage of the extended shaft 44 of the pushbutton assembly 40. Also shown is the first rotatable splined pin assembly 20 comprising an outer head portion 22, which has a generally triangular-shaped outer side surface 28, a flat plate attachment surface 24, and fastening openings 26 (not shown) to permit connection of the headrest attachment plate 10. Here the second rotatable splined pin assembly 96 includes an outer head portion 98 that has a generally circular-shaped outer side surface 100 and is integrally formed as one unit to include backrest attachment plate 110. Both the first rotatable splined pin assembly 20 and the second rotatable splined pin assembly 96 are mounted on the first outer surface 122 of the housing component 52.

Figure 3:
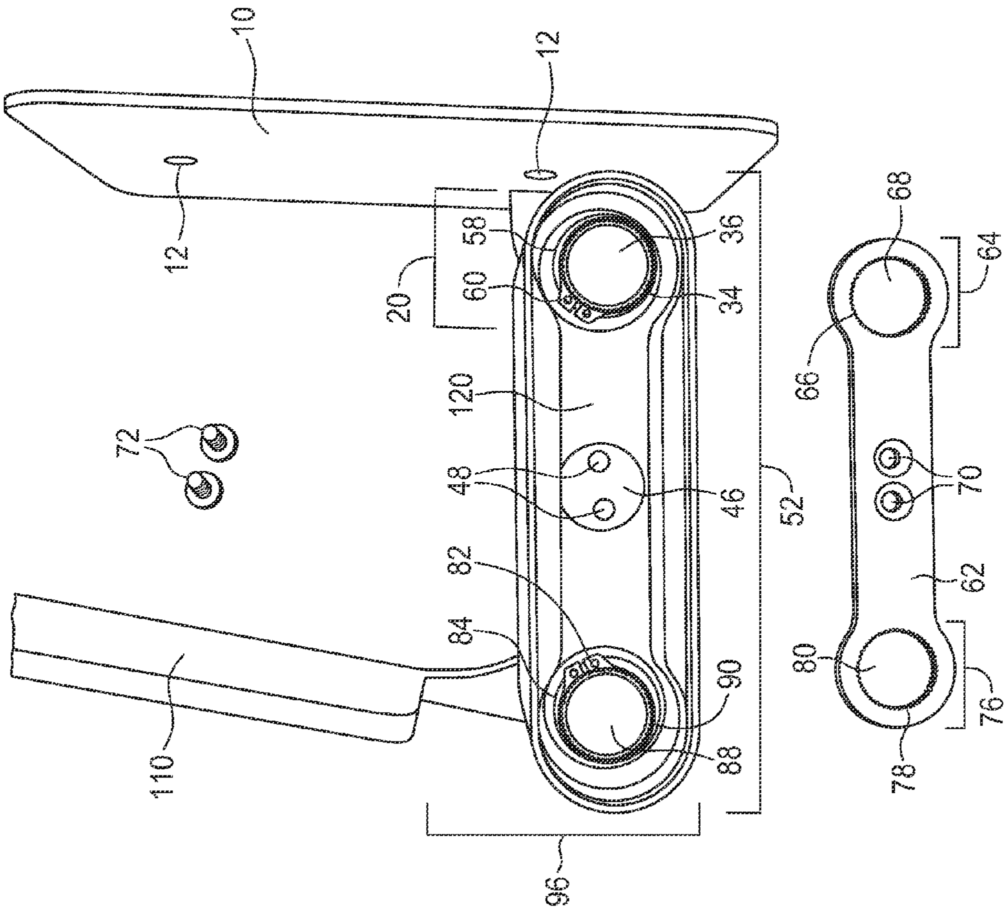
FIG. 3 provides a partial side view of a folded and partially dis-assembled double articulating dental chair headrest apparatus according to the present invention, with the movable mating plate and fastening means removed.

FIG. 3 provides a side view of a folded and partially dis-assembled double articulating dental chair headrest apparatus according to the present invention, with the optional cover plate 74 (not shown), movable mating plate 62 having splined perforations 68 and 80, and fastening means 72 removed. The splined surface 66 of the first splined perforation 68 corresponds to the circumferentially toothed splined portion 34 of the first rotatable splined pin assembly 20. The splined surface 78 of the second splined perforation 80 corresponds to the circumferentially toothed splined portion 90 of the second rotatable splined pin assembly 96.

As depicted, the housing component 52 is generally oval-shaped and comprises a bottom internal surface 120 opposite to the first outer surface 122 (not shown) of the housing component 52. Three openings are provided in the bottom internal surface 120 which extend through to the first outer surface 122 (not shown). Opening 118 (not visible due to occupation by the extended shaft 44 of the pushbutton assembly 40) accommodates passage of the extended shaft 44 (not indicated) of the pushbutton assembly 40 (not indicated). The extended shaft 44 (not indicated) has fastening openings 48 in a flat surface 46, corresponding to the bottom of the pushbutton assembly, for connection to the movable mating plate 62 via fastening means 72.

Openings 112 (not visible due to occupation by either of the first rotatable splined pin assembly 20 and the second rotatable splined pin assembly 96) accommodate, on one end, passage of the first splined pin axle 30 (not indicated) of the first rotatable splined pin assembly 20, and on another end, passage of the second splined pin axle 94 (not indicated) of the second rotatable splined pin assembly 96. As depicted, the snap ring 60 which is attached to reduced circumference ring area 32 (not indicated) of the first splined pin axle 30 (not indicated) of the first rotatable splined pin assembly 20 is visible. Also, the circumferentially toothed spline portion 34 and a flat circular end surface 36 of the first rotatable splined pin assembly 20 are visible. Nylon washer 58 and snap ring 60 are also located around the first splined pin axle 30 (not indicated) and, as assembled, between the bottom internal surface 120 of the housing component 52 and the interior surface of the first end portion 64 of the movable mating plate 62 having splined perforations 68 and 80. Also as depicted, the snap ring 82 which is attached to reduced circumference ring area 92 (not indicated) of the second splined pin axle 94 (not indicated) of the second rotatable splined pin assembly 96 is visible. The circumferentially toothed spline portion 90 and a flat circular end surface 88 of the second rotatable splined pin assembly 96 are visible. The nylon washer 84 and snap ring 82 are located around the second splined pin axle 94 (not indicated) and, as assembled, between the bottom internal surface 120 and the interior surface the second end portion 76 of the movable mating plate 62 having splined perforations 68 and 80.

Figure 4:
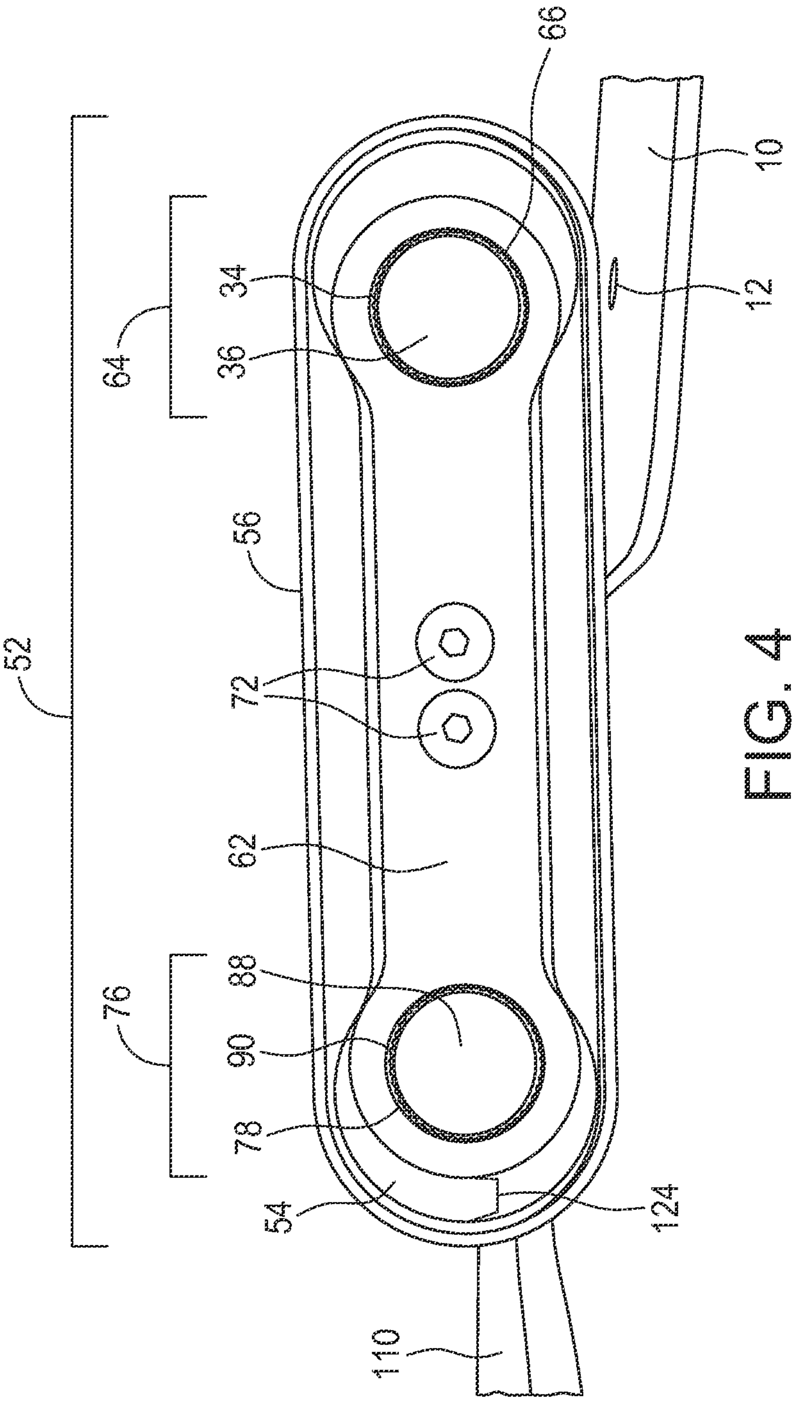
FIG. 4 provides a partial side view of a folded double articulating dental chair headrest apparatus according to the present invention, without the optional cover plate.

FIG. 4 provides a partial side view of a folded double articulating dental chair headrest apparatus according to the present invention in a locked position, without the optional cover plate 74 (not shown). The circumferentially toothed splined portion 34, and a flat circular end surface 36 of the first splined pin axle 30 (not indicated) of the first rotatable splined pin assembly 20 (not indicated) is shown. The splined surface 66 of the first splined perforation 68 (not indicated) at a first end portion 64 of movable mating plate 62 is shown to complement and match the circumferentially toothed splined portion 34 of the first rotatable splined pin assembly 20 (not indicated). The circumferentially toothed splined portion 90, and a flat circular end surface 88 of the second splined pin axle 94 (not indicated) of the second splined pin assembly 96 (not indicated) is shown. The splined surface 78 of the second splined perforation 80 (not indicated) at a second end portion 76 of movable mating plate 62 is shown to complement and match the circumferentially toothed splined portion 90 of the second rotatable splined pin assembly 96 (not indicated).

As depicted, the circumferentially toothed splined portion 34 of first rotatable splined pin assembly 20 (not indicated) and the circumferentially toothed splined portion 90 of the second rotatable splined pin assembly 96 (not indicated) are shown fully mated, and locked, with the splined surfaces 66 and 78, respectively, of the movable mating plate 62.

Defining one outer portion of the interior cavity 54 of the housing component 52 is a variable distance interior wall space 124 between the outer surface of the movable mating plate 62 and the outer peripheral edges of the housing component 52 which surround interior cavity 54 and define a second side surface of the housing component 52, which is opposite to the first substantially flat outer surface 122 (not shown and not indicated).

As depicted, the pushbutton assembly 40 is not depressed. When the pushbutton assembly 40 is depressed, however, the movable mating plate 62 having a splined perforation 68 with a splined surface 66, and a splined perforation 80 with a splined surface 78, is simultaneously unlocked from each of the circumferentially toothed splined portion 34 of the first rotatable splined pin assembly 20 and the circumferentially toothed splined portion 90 of the second rotatable splined pin assembly 96, respectively, and pushed out towards the outer peripheral edges of the housing component 52 which surround interior cavity 54 and define a second side surface of the housing component 52. Accordingly, the amount of variable interior wall space 124 between the outer surface of the movable mating plate 62 and the outer peripheral edges of the housing component 52 which surround interior cavity 54 and define a second side surface of the housing component 52 is reduced when the pushbutton is pressed and the double articulating dental chair headrest apparatus is in an unlocked position. The variable distance interior wall space 124 between the outer surface of the movable mating plate 62 and the outer peripheral edges of the housing component 52 which surround interior cavity 54 and define a second side surface of the housing component 52 is at its maximum distance when the pushbutton assembly 40 is not depressed and the double articulating dental chair headrest apparatus is in its locked condition.

Figure 5:
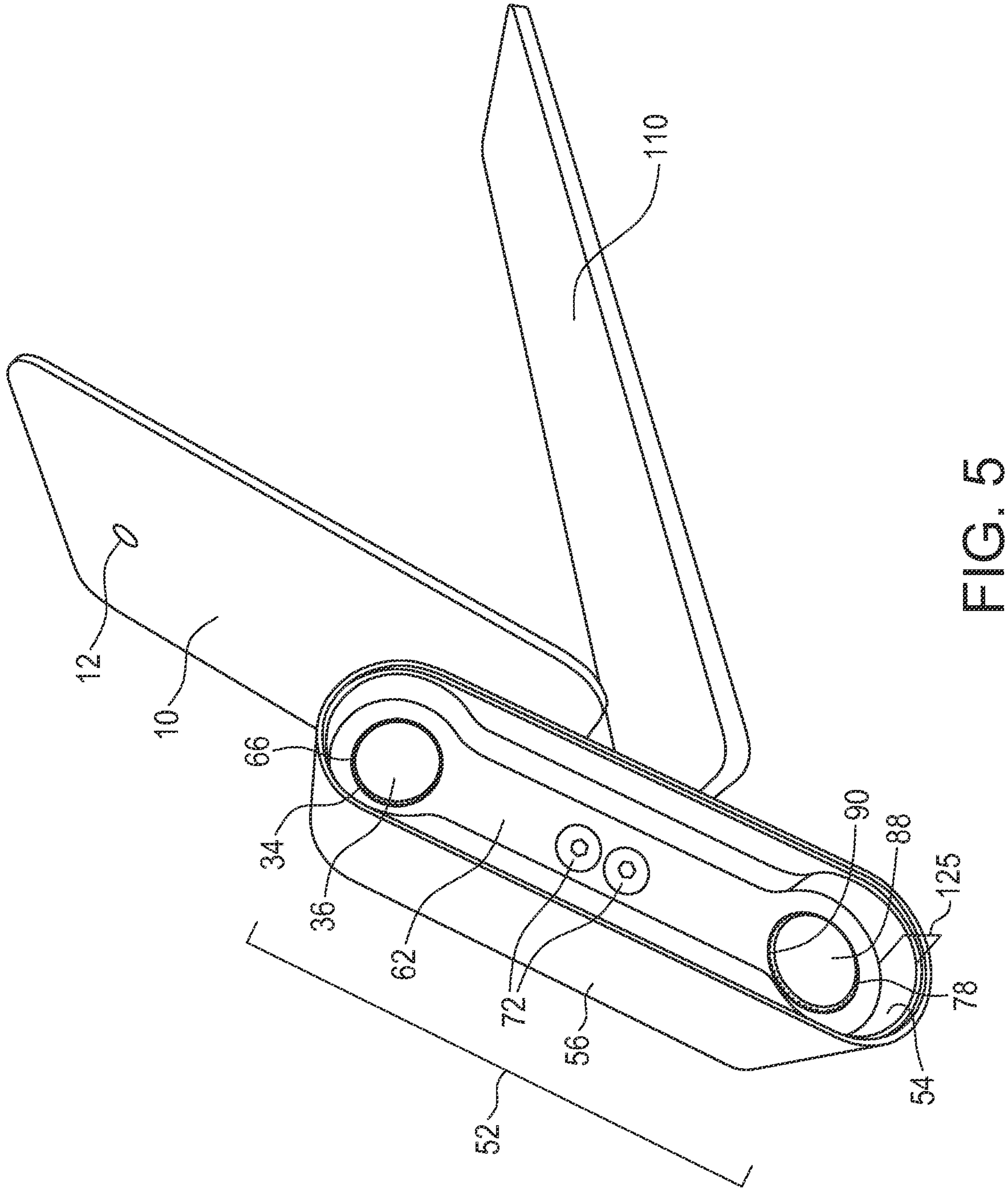
FIG. 5 provides a perspective view of a folded double articulating dental chair headrest apparatus according to the present invention in a locked position.

FIG. 5 provides a perspective view of a folded double articulating dental chair headrest apparatus with a movable mating plate 62 according to the present invention in a locked position.

Figure 6:
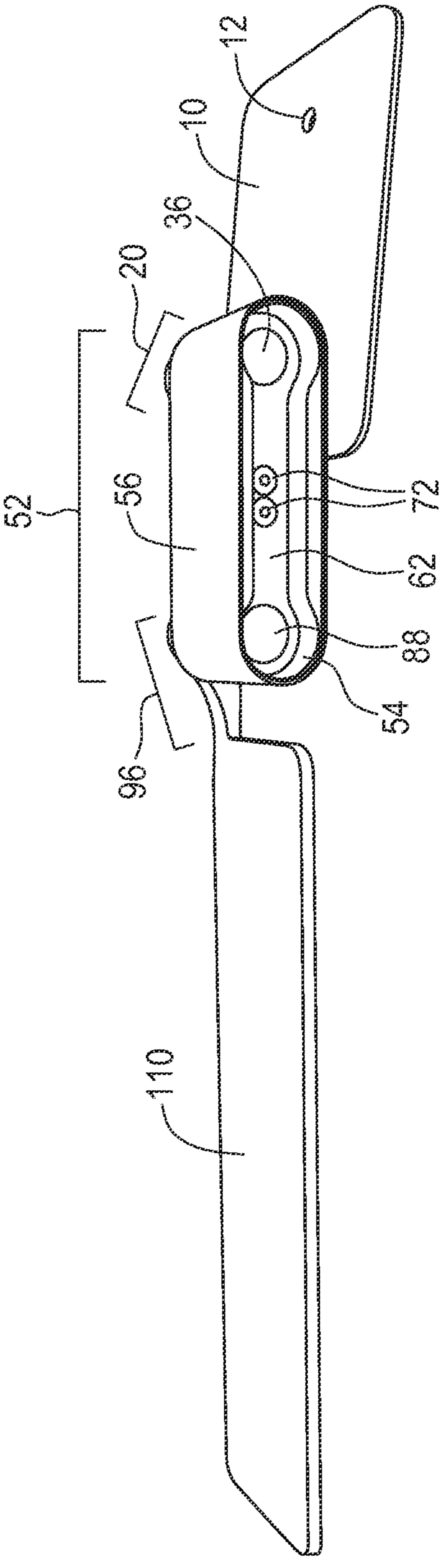
FIG. 6 provides a view of a fully extended double articulating dental chair headrest apparatus according to the present invention in a locked position.

FIG. 6 provides a view of a fully extended double articulating dental chair headrest apparatus according to the present invention in a locked position.

Figure 7:
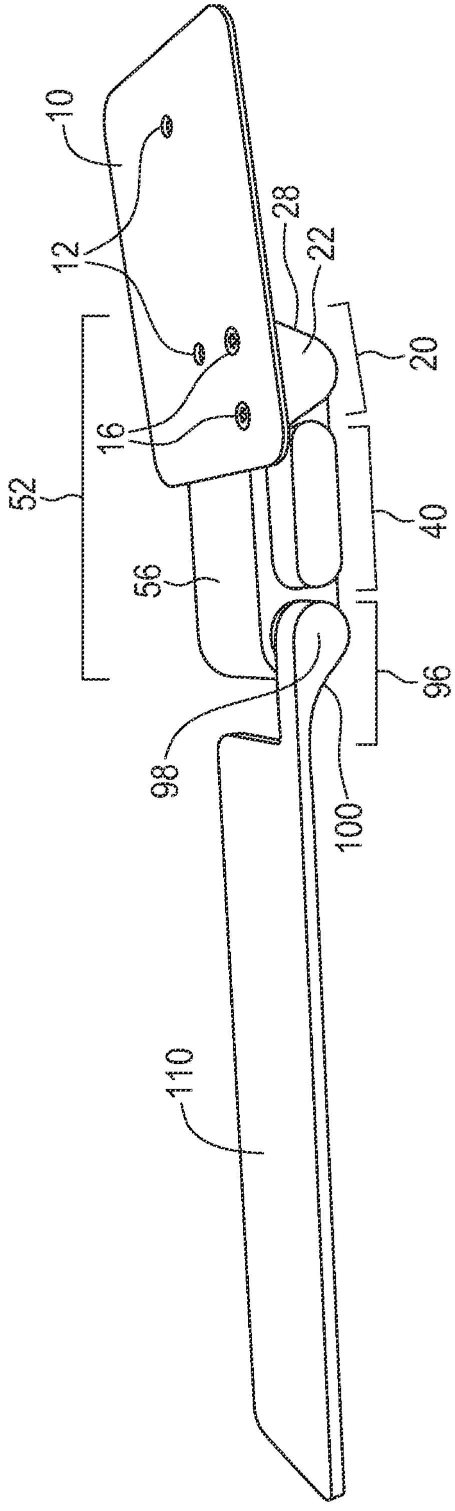
FIG. 7 provides a view of a fully extended double articulating dental chair headrest apparatus with a pushbutton assembly according to the present invention in a locked position.

FIG. 7 provides a view of a fully extended double articulating dental chair headrest apparatus with a pushbutton assembly according to the present invention in a locked position.

Figure 8:
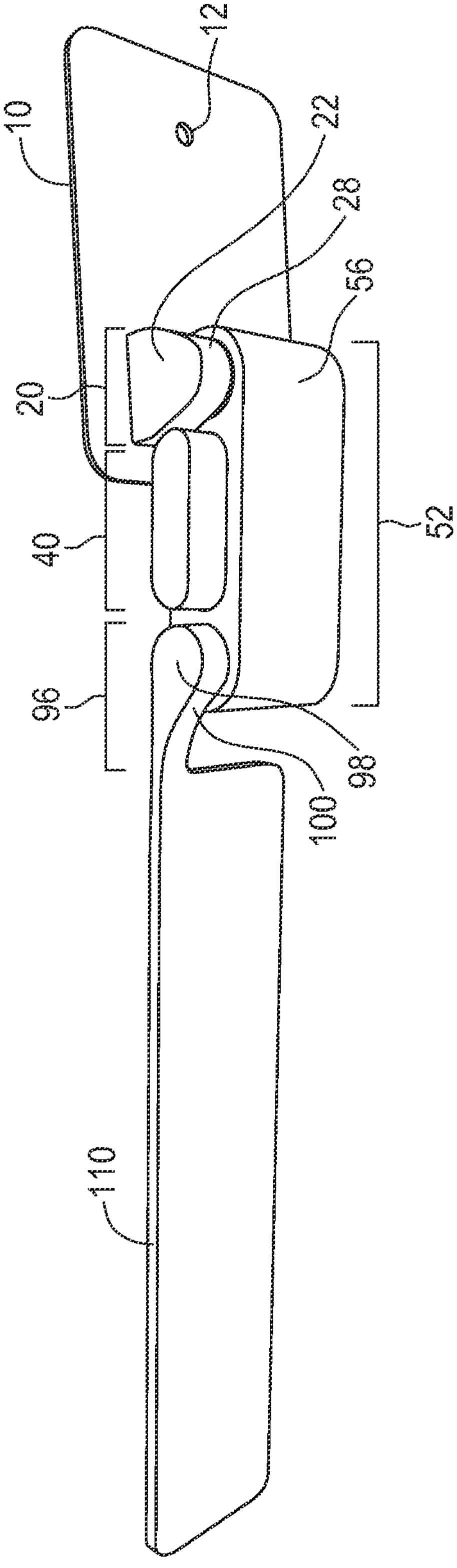
FIG. 8 provides a three-quarters view of a fully extended double articulating dental chair headrest apparatus with a pushbutton assembly according to the present invention in a locked position.

FIG. 8 provides a three-quarters view of a fully extended double articulating dental chair headrest apparatus with a pushbutton assembly according to the present invention in a locked position.

Figure 9:
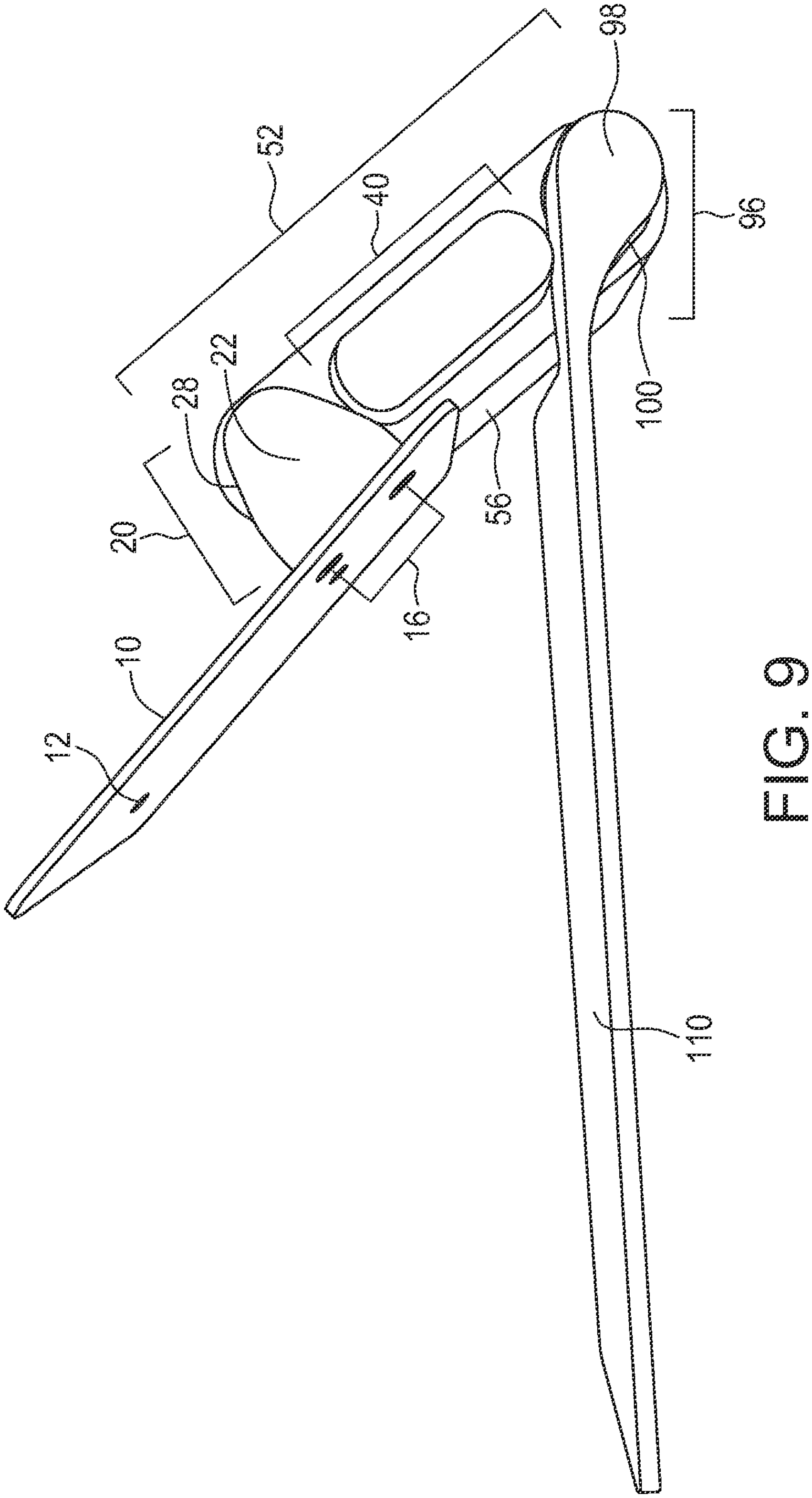
FIG. 9 provides a side view of a maximally folded double articulating dental chair headrest apparatus with a pushbutton assembly according to the present invention in a locked position.

FIG. 9 provides a side view of a maximally folded double articulating dental chair headrest apparatus with a pushbutton assembly according to the present invention in a locked position. As depicted, the headrest attachment plate 10 is generally rectangular in shape. The headrest attachment plate 10 is shown oriented with its headrest attachment surface facing downwards towards the backrest attachment plate 110. As shown, the outer head portion 22 of the first rotatable splined pin assembly 20 is in contact with the pushbutton assembly 40. Additionally, the outer head portion 98 of the second rotatable splined pin assembly 96 is in contact with the pushbutton assembly 40. In the embodiment shown, the pushbutton assembly 40 blocks both the further rotation of the outer head portion 22 of the first rotatable splined pin assembly 20 and the further rotation of the outer head portion 98 of the second rotatable splined pin assembly 96.

Figure 10:
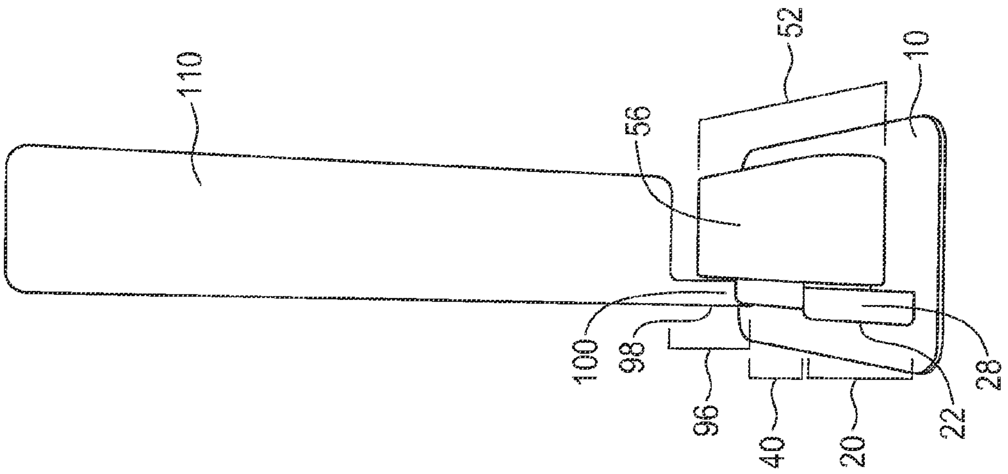
FIG. 10 provides a top and end view of a folded double articulating dental chair headrest apparatus according to the present invention in a locked position.

FIG. 10 provides a top and end view of a folded double articulating dental chair headrest apparatus according to the present invention in a locked position. As depicted, the headrest attachment plate 10 is oriented with the headrest attachment surface facing downwards. In this orientation, the headrest attachment plate 10 provides a resting surface upon which the housing component 52 rests. The backrest attachment plate 110 is similarly positioned with respect to the pushbutton assembly 40 as described above in connection with FIG. 9.

The invention claimed is:

1. A double articulating headrest apparatus comprising:

a first rotatable splined pin assembly having a splined surface area;

a second rotatable splined pin assembly having a splined surface area;

a movable mating plate having a pair of splined perforations, each splined perforation corresponding to the splined surface areas of the first rotatable splined pin assembly and the second rotatable splined pin assembly respectively;

a spring mounted pushbutton assembly release and locking mechanism fixedly connected to the movable mating plate;

a pair of springs separate from each of the first rotatable splined pin assembly and the second rotatable splined pin assembly and located between the pushbutton assembly release and locking mechanism and the movable mating plate; and a housing component housing the pin assemblies, the mating plate, pushbutton assembly release and locking mechanism, and the springs.

2. The apparatus of claim 1, wherein the pushbutton assembly release and locking mechanism is connected to the movable mating plate.

3. The apparatus of claim 1, in a locked configuration, wherein the splined surface areas of each of the first rotatable splined pin assembly and the second rotatable splined pin assembly are in contact with the splined perforations of the movable mating plate.

4. The apparatus of claim 1, further comprising a depressed pushbutton assembly release and locking mechanism in a released configuration, wherein the splined surface areas of each of the first rotatable splined pin assembly and the second rotatable splined pin assembly are spaced apart from the splined perforations of the movable mating plate.

5. The apparatus of claim 4, wherein the first rotatable splined pin assembly freely rotates about a first axis and the second rotatable splined pin assembly freely rotates about a second axis.

6. The apparatus of claim 1, wherein the housing component holds the first rotatable splined pin assembly and the second rotatable splined pin assembly in a parallel orientation, and wherein one of an exterior surface of the movable mating plate and a cover plate provides an exterior surface of the apparatus.

7. The apparatus of claim 1, wherein the pushbutton assembly release and locking mechanism is located between the first rotatable splined pin assembly and the second rotatable splined pin assembly.

8. The apparatus of claim 1, wherein the housing component comprises:

a substantially flat first side surface with a first opening corresponding to the first rotatable splined pin assembly, a second opening corresponding to the second rotatable splined pin assembly, and a third opening corresponding to the pushbutton assembly release and locking mechanism; and a second side surface located opposite to the first side surface and defined by outer peripheral edges surrounding an internal open space, and wherein one of an exterior surface of the movable mating plate and a cover plate provides an exterior surface of the apparatus.

9. The apparatus of claim 1, wherein the housing component holds the first rotatable splined pin assembly and the second rotatable splined pin assembly, the movable mating plate having splined perforations, and the pushbutton assembly release and locking mechanism in a fixed spatial relationship.

10. The apparatus of claim 9, wherein the second attachment end of the splined pin axle of each of the first rotatable splined pin assembly and the second rotatable splined pin assembly extends through and outwardly from a substantially flat first side surface of the housing component.

11. The apparatus of claim 1, wherein the first rotatable splined pin assembly and the second rotatable splined pin assembly each further comprise a splined pin axle having a first splined end and a second attachment end.

12. The apparatus of claim 11, wherein the first splined end of the splined pin axle of each of the first rotatable splined pin assembly and the second rotatable splined pin assembly is held in place by a snap ring attached to a reduced circumference ring area on the first splined end.

13. The apparatus of claim 11, wherein the splined surface areas are located near the first splined end of the splined pin axle of each of the first rotatable splined pin assembly and the second rotatable splined pin assembly.

14. The apparatus of claim 13, wherein the housing component protects the movable mating plate having splined perforations and the splined surface areas of the first rotatable splined pin assembly and the second rotatable splined pin assembly.

15. The apparatus of claim 1, further comprising at least one of a headrest attachment plate connected to the first rotatable splined pin assembly and a backrest attachment plate connected to the second rotatable splined pin assembly.

16. A method of using the apparatus of claim 1, comprising:

depressing the spring mounted pushbutton assembly release and locking mechanism to unlock the movable mating plate; and disengaging the movable mating plate by moving it outwardly away and apart from each of the first rotatable splined pin assembly and the second rotatable splined pin assembly.

17. A method of using the apparatus of claim 16, further comprising:

using a single hand to unlock and adjust the apparatus; and simultaneously adjusting the apparatus along multiple axes.

18. A method of using the apparatus of claim 1, further comprising:

removing pressure from the pushbutton assembly release and locking mechanism to lock the apparatus; and simultaneously engaging the movable mating plate with each of the first rotatable splined pin assembly and the second rotatable splined pin assembly.

19. A method of using the apparatus of claim 18, further comprising:

using a single hand to lock the apparatus into an adjusted position simultaneously along multiple axes.

20. A double articulating headrest apparatus comprising:

a first rotatable splined pin assembly having a splined surface area, wherein the first rotatable splined pin assembly rotates about a first axis;

a second rotatable splined pin assembly having a splined surface area wherein the second rotatable splined pin assembly rotates about a second axis;

a movable mating plate having a pair of splined perforations, each splined perforation corresponding to the splined surface areas of the first rotatable splined pin assembly and the second rotatable splined pin assembly respectively;

a housing component holding the first rotatable splined pin assembly and the second rotatable splined pin assembly in a parallel orientation and having a substantially flat first side surface with multiple openings and a second side surface located opposite to the first side surface and defined by outer peripheral edges surrounding an internal open space; and a spring mounted pushbutton assembly release and locking mechanism fixedly connected to the movable mating plate located between the first and the second rotatable splined pin assemblies.

* * * * *